United States Patent

[11] 3,569,679

[72] Inventor Donald A. Bly
West Simsbury, Conn.
[21] Appl. No. 673,041
[22] Filed Oct. 5, 1967
[45] Patented Mar. 9, 1971
[73] Assignee Veeder Industries Inc.
Hartford, Conn.

[54] COUNTING SYSTEM
13 Claims, 4 Drawing Figs.
[52] U.S. Cl. ............................. 235/92,
222/25
[51] Int. Cl. ................................ G06m 1/12,
G06m 3/11
[50] Field of Search............................. 222/25, 26,
27, 28; 235/92(51), (66), (29A), (70), (73), (21)

[56] References Cited
UNITED STATES PATENTS
2,663,495 12/1953 Ramsell.......................... 235/61
2,100,052 11/1937 Hejduk........................... 73/198
3,314,049 4/1967 Felcheck........................ 340/172.5

Primary Examiner—Maynard R. Wilbur
Assistant Examiner—Robert F Gnuse
Attorney—Prutzman, Hayes, Kalb & Chilton ABSTRACT: A counting system for a gasoline service station for accounting for the amount of fuel remaining in the station storage tank. In the embodiment of FIGS. 1 and 2 a register is employed for each of the service station pumps to provide an accounting of the amount of fuel delivered by the respective pump, and a separate inventory register is provided for registering the amount of fuel delivered to the underground storage tank. The pump registers and the inventory register comprise conventional single wheel magnetic counters and the count of each of the pump registers is adapted to be subtracted from the count of the inventory register as the pump register is reset to zero by adding the complement of the count of the pump register to the count of the inventory register.

In the embodiments of FIGS. 3 and 4 the pumps are connected in parallel to a single subtracting inventory register. A separate tank register is provided for recording the amount of fuel delivered to the storage tank and this amount is adapted to be added to the inventory register as the tank register is reset to zero by subtracting the complement of the count of the tank register from the count of the inventory register. The embodiment of FIG. 3 provides circuitry for diminishing the counting error due to overlapping electrical pulses received from two or more pumps and the embodiment of FIG. 4 provides circuitry for eliminating such errors altogether.

INVENTOR.
DONALD A. BLY

BY Lindsey, Prutzman and Hayes
ATTORNEYS

COUNTING SYSTEM

BRIEF SUMMARY OF THE INVENTION

The present invention generally relates to counting systems and more particularly to a counting system having notable utility for accounting for the amount of goods, for example fuel, disbursed or the amount received and/or an accounting of the amount remaining.

It is a principal aim of the present invention to provide a new and improved accounting system of the type described which is adapted for providing an accounting of the amount of fuel remaining in the storage tanks of a fuel service station.

It is another aim of the present invention to provide a new and improved accounting system adapted for providing an accounting of the amount of goods, for example fuel, disbursed and upon demand an inventory of the goods remaining.

It is a further aim of the present invention to provide a new and improved accounting system of the type described which is simple to operate and of economical design.

It is another aim of the present invention to provide a new and improved counting system which employs conventional single wheel magnetic counters for registering the desired accounting.

It is a further aim of the present invention to provide a counting system having first and second counting devices employing single wheel magnetic counters and which may be independently indexed to record a count, and wherein a count of the first counting device may be added to (or subtracted from) the count of the second counting device as the first counting device is reset to zero.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

DESCRIPTION OF THE PREFERRED EMBODIMENTS

Figure 1:
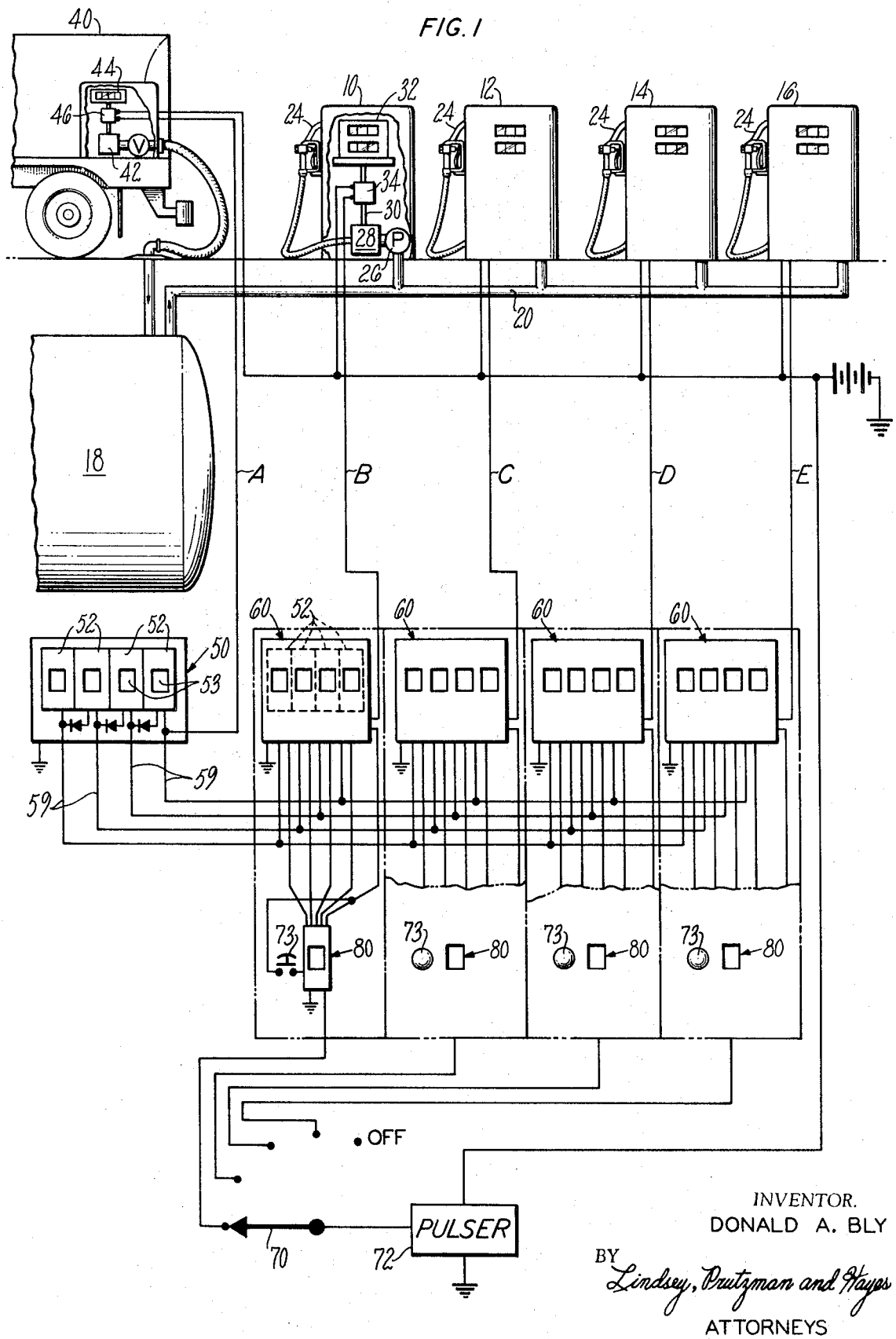
FIG. 1 is a schematic view partly broken away showing a fuel service station with an embodiment of an inventory accounting system of the present invention.
Figure 2:
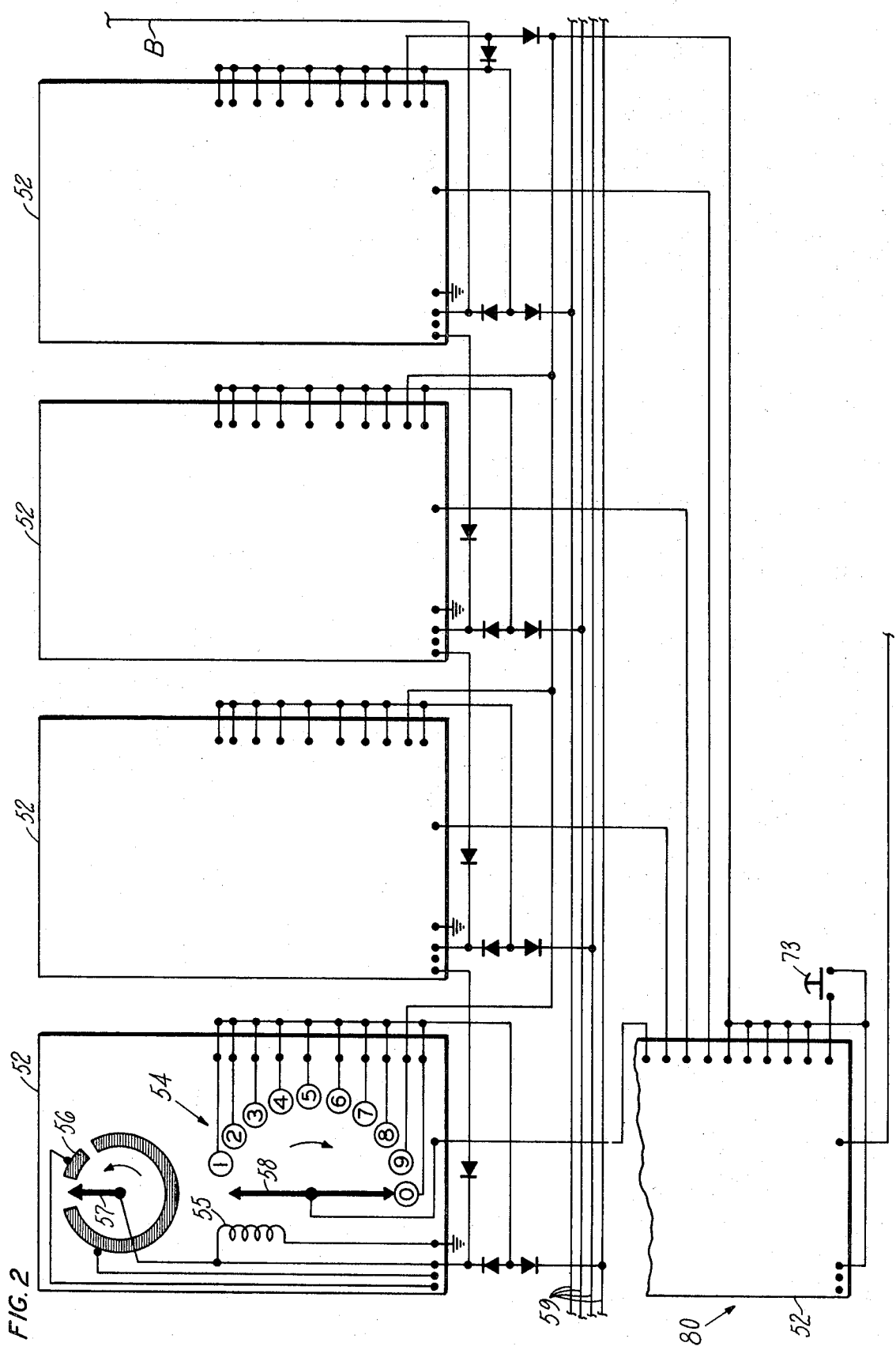
FIG. 2 is a partial schematic view of an individual register and register resetting circuit of the inventory accounting system of FIG. 1.

Referring now to the drawings in detail, wherein like numerals and letters represent like parts, and in particular to FIGS. 1 and 2, an embodiment of an inventory accounting system of the present invention is shown installed for accounting for the amount of fuel delivered by each of four dispensing pumps 10, 12, 14 and 16 and for accounting for the inventory of gasoline remaining in the usual underground storage tank 18.

The pumps 10, 12, 14 and 16 are connected by a conduit 20 to the underground tank 18 and in a conventional manner may be employed for delivering fuel with their dispensing nozzles 24. Each of the pumps is shown having a suitable motor driven pump 26 for supplying fuel under pressure to the nozzle 24, and a meter 28 is provided in the fuel line to measure the volume of fuel delivered. In a conventional manner, the output shaft 30 of the meter 28 is connected for driving a register 32 for registering the volume and cost of the fuel delivered. Each pump is also provided with a suitable pulse generator 34 which provides an electrical pulse for each unit volume, for example one gallon or one-tenth of a gallon, of fuel dispensed.

Fuel is adapted to be delivered to the underground storage tank 18 from a tank truck 40 which is shown provided with a suitable meter 42 and a register 44 that is driven by the meter 42 for registering the volume of fuel delivered to the underground tank. A suitable pulse generator 46 driven by the meter is also shown provided for generating an electrical pulse for each unit volume of fuel dispensed. The pulse generator 46 is adapted to be connected via a lead A to an inventory or balance register 50 for indexing the register 50 and for thereby accounting for the amount of fuel delivered from the tank truck 40 to the underground storage tank 18. Alternatively, if desired, a manually settable register 50 could be used and be manually set after each truck delivery to the underground tank 18 to add the amount of the delivery which would be recorded by the truck register 44.

The register 50 preferably comprises a bank of conventional single wheel magnetic counters 52 of the type having a single number wheel 53 which is adapted to be indexed by an electrical stepping magnet 55 and a readout section 54 which in conventional usage provides an electrical readout of the numerical position of the number wheel. The number wheel is preferably adapted to be indexed at the end of each electrical pulse when the counter stepping magnet 55 is deenergized. And, when an adjacent lower order single wheel counter 52 of the bank reaches its 9 position, a transfer is generated to the adjacent higher order single wheel counter 52 as a result of the contact with the transfer segment 56 by the number wheel wiper arm 57 of the adjacent lower order single wheel counter.

The readout section 54 in the shown embodiment employs a second wiper arm 58 which is indexed with and at one-half the angular displacement of the number wheel 53 and wiper arm 57 so as to make contact with the ten readout contacts which correspond to the ten angular positions of the number wheel. Also as shown in FIG. 1, individual leads 59 to the single wheel counters 52 of the register 50 are employed in order to provide for parallel entry to the single wheel counters as hereinafter explained.

A register 60 having the same number of single wheel counters 52 as the register 50 is provided for each of the fuel pumps, and the pump pulse generators 34 are connected via the leads B, C, D and E to index the corresponding register 60 to record the volume of fuel delivered by the pumps.

The accounting system provides for selectively resetting the registers 60 to zero and for subtracting the count of the selected register 60 from the count of the register 50. Accordingly, after all of the registers 60 have been reset, the register 50 will provide an accounting of the fuel remaining in the underground storage tank 18. Also, at any moment the amount of fuel remaining in the storage tank 18 equals the volume shown in the register 50 minus the total of the volumes shown in the registers 60.

A reset selector switch 70 is provided for selectively connecting the register 60 to a suitable DC pulser 72, and when a rest button 73 associated with the selected register 60 is pressed, the electrical pulses generated by the pulser are used to reset the selected register 60 and to index the corresponding single wheel counters of the register 50 to subtract the count of the selected register 60 from the count of the register 50 by adding the complement of the count of the register 60 to the count of the register 50.

More particularly, the count in each register 60 may be subtracted from the count in the register 50 by adding the 10 complement of the count (including 0) of the lowest order or place of the register 60 to the count of the corresponding place of the register 50, and by adding the 9 complement of the remaining higher place counts of the register 60 to the counts of the corresponding places of the register 50 respectively. Thus, for example, if there is a count of 8,625 in the register 50 and a count of 1,436 in the selected register 60, this latter number can be subtracted from the former by adding the 10 complement of the number 6 (i.e. 4) to the first place or lowest order count of 5; by adding the 9 complement of 3 (i.e. 6) to the second place or order count of 2; by adding the 9 complement of 4 (i.e. 5) to the third place count of 6; and by adding the 9 complement of 1 (i.e. 8) to the fourth place count of 8. In other words, 8,625 + 8,564 = 17,189, and as the register 50 is not provided with a fifth place single wheel counter, the count of the register 50 will be 7,189 (which is 8,625 − 1,436).

Referring particularly to FIG. 2, a register resetting or dumping system is shown for resetting the individual single wheel counters 52 of the register 60 to zero and for simultaneously indexing the corresponding single wheel counters 52 of the register 50 via the parallel entry leads 59 to subtract the count in the register 60 from the count in the register 50. For this purpose the single wheel counters 52 of the register 60 are connected so that the contact arms 58 of the readout section 54 provide for energizing the corresponding parallel entry leads 59 for indexing the corresponding single wheel counters 52 of the register 50.

Additionally, a single wheel counter is used as a stepping switch 80 for sequentially connecting the pulser 72 to the single wheel counters of the register 60. When the pump selector switch 70 is positioned to select one of the register 60 and the corresponding reset or dumping switch 73 is momentarily depressed, the selector switch 80 will be indexed one step to connect the pulser 72 for indexing the highest order single wheel counter of the register 60 in stepwise fashion to 9 and to simultaneously index the corresponding single wheel counter of the register 50 in stepwise fashion the same number of steps. Thus, if the highest order single wheel counter of the selected pump register 60 is at 1, it and the corresponding counter of the register 50 will be indexed eight steps. And, if the single wheel counter of the register 60 is at 0, it and the corresponding single wheel counter of the register 50 will be indexed nine steps.

When the highest order single wheel counter of the pump register 60 is at 9, the next pulse from the pulser 72 will provide for indexing the stepping switch 80 to connect the pulser 72 to the next adjacent lower order single wheel counter of the selected pump register 60. This counter will then be indexed in stepwise fashion to 9 and the corresponding single wheel counter of the register 50 will likewise be indexed the same number of steps. The stepping switch 80 will then be indexed to connect the next adjacent lower order single wheel counter of the register 60 to the pulser 72.

The lowest order single wheel counter of the register 60 is connected to be indexed to 0, and when it is indexed from 9 to 0 a transfer pulse is provided to the higher order single wheel counters of the register 60 in the usual way to index the higher order counter wheels to 0 (without, however, at the same time indexing the corresponding single wheel counters of the register 50 with the transfer pulse). Also, as the lowest order single wheel counter of the register 60 is indexed from 9 to 0, the stepping switch 80 is also indexed to end the resetting or dumping operation.

Figure 3:
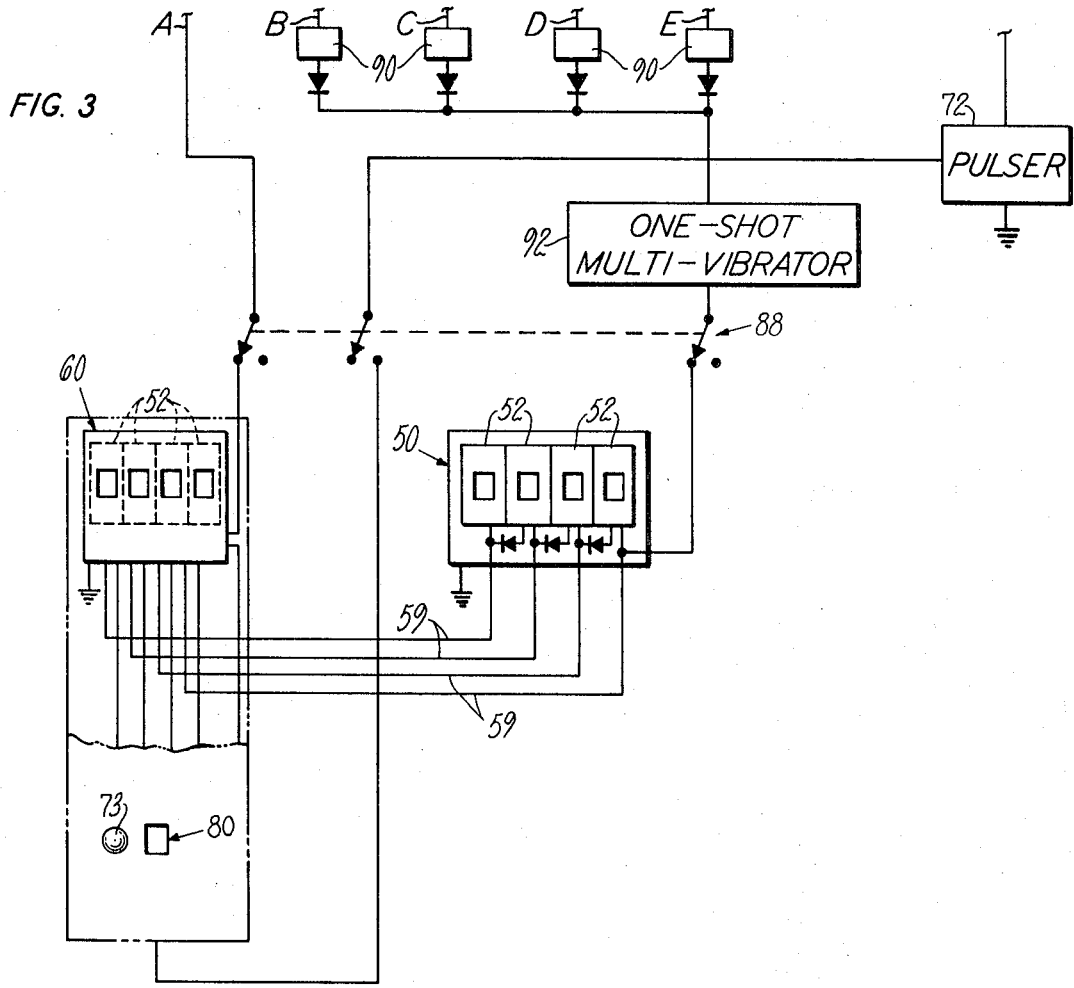
FIG. 3 is a partial schematic view of another embodiment of an inventory accounting system of the present invention.

Referring to FIG. 3, another embodiment of an inventory accounting system is shown in which the pulse generators 34 are connected in parallel to index the inventory register 50 for accounting for the total volume of fuel delivered by the pumps 10, 12, 14, 16. In this system the single wheel counters of the register 50 are subtracting counters (i.e. the counters are indexed in the subtracting direction) so that the volume of fuel delivered is subtracted from the count of the register 50 as fuel is delivered.

The lead A from the tank truck pulse generator 46 is in turn connected to a receipts register 60 to provide an accounting of the volume of fuel delivered to the underground storage tank 18. The register 60 is provided with a reset or dumping circuit as previously described with respect to the system of FIGS. 1 and 2 such that the register 60 may be reset and its count simultaneously transferred to the register 50 by operation of a selector switch 88 and by momentarily depressing the reset switch 73. Since the single wheel counters of the register 50 are indexed in the subtracting direction, the count of the register 60 can be added to the count of the register 50 by subtracting the complement of the count of the register 60 from the count of the register 50 as the register 60 is reset in the manner of the embodiment of FIGS. 1 and 2.

Accordingly, after fuel is delivered to the underground tank 18 and the register 60 has been set either automatically by the pulse generator 46 or manually in accordance with the reading of the truck register 44, the register 60 can be reset to transfer its count to the inventory register 50 to provide an inventory of the amount of fuel in the storage tank.

In order to reduce the probability of losing signals from the pulse generators 34 due to overlapping signals, the pulse generators are connected to differentiators 90 to substantially reduce the length of the pulse generator signal to, for example, approximately 4 to 6 milliseconds (depending upon the rate of delivery of fuel), and one-shot differentiators are connected to a one-shot multivibrator 92 to generate an optimum pulse length, for example 24 milliseconds, which provides good register response and high speed operation.

However, there is still a possibility that the signals received from two or more of the pulse generators 34 will be fed to the one-shot multivibrator at substantially the same time and there will be a resulting error in the reading of the register 50. The probability of error due to overlapping signals when four pumps are delivering fuel at approximately 40 gallons per minute and the pulse counters are operated to provide a pulse for each gallon of fuel delivered is approximately 6 percent. And the register 50 would then indicate a greater than actual balance by an amount equal to approximately 6 percent of the amount of fuel delivered. Such an inaccuracy may be acceptable, however, where an exact accounting is unnecessary and may be partially or entirely nullified by an offsetting error created by advancing the operation of the pulse generators 34 slightly.

Figure 4:
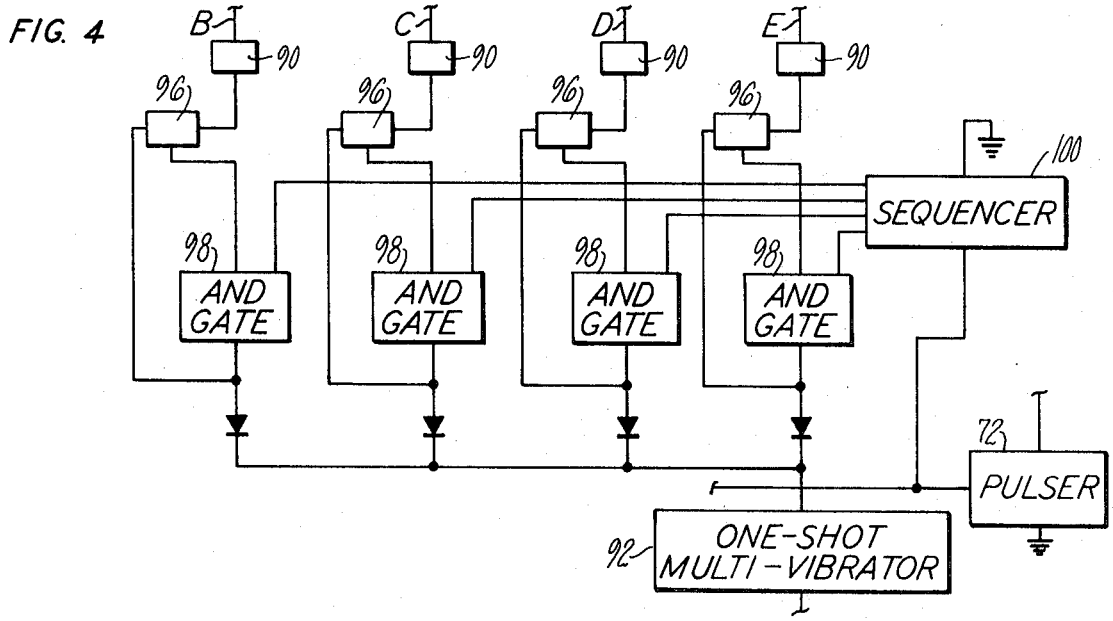
FIG. 4 is a partial schematic view of still another embodiment of an inventory accounting system of the present invention.

Alternatively, the inaccuracy resulting from overlapping signals can be eliminated by employing the circuit shown in FIG. 4. In this circuit the differentiators 90 are connected to a flip-flop switch 96 and the output of the flip-flop switch is connected to an AND gate 98. A sequencer or stepping switch 100 operated by the pulser 72 and connected to the AND gates 98 continually searches the AND gates. Accordingly, after a flip-flop switch 96 has been actuated to its "on" position by the respective pulse generator 34, the sequencer 100 will provide for actuating the flip-flop switch to its "off" position and simultaneously actuate the one-shot multivibrator to index the register 50.

As will be apparent to persons skilled in the art, various modifications and adaptations of the structure above described will become readily apparent without departure from the spirit and scope of the invention the scope of which is defined in the appended claims.

I claim:

1. In combination with a fuel dispensing system having fuel storage means for receiving and storing fuel and fuel dispensing means for dispensing fuel from the fuel storage means, a counting system for accounting for the fuel remaining in the storage means comprising a first rotary counting device having a plurality of counter wheels of ascending order adapted to be individually angularly indexed in operational angular directions thereof and connected to be indexed in accordance with the amount of fuel received by the storage means, a second rotary counting device having a plurality of counter wheels of ascending order adapted to be individually angularly indexed in operational angular directions thereof and connected to be indexed in accordance with the amount of fuel dispensed by the fuel dispensing means, at least one of said counting devices being resettable to zero by angularly indexing the counter wheels thereof in their operational angular directions, and inventory accounting means for combining the counts of the first and second counting devices for determining the amount of fuel remaining in the storage means, the accounting means being selectively operable for angularly resetting the counter wheels of said one counting device in their operational angular directions individually and in a predetermined sequence and for simultaneously combining the count of said one counting device with the count of the other counting device by simultaneously angularly indexing the corresponding counter wheels of the other counting device in their operational angular directions and accordingly by indexing said other counting device in accordance with the complement of the count of said one counting device.

2. The combination of claim 1 wherein the first rotary counting device is said one counting device and the second rotary counting device is said other counting device, and wherein the first rotary counting device provides an additive count when indexed in its operational angular direction and the second rotary counting device provides a subtractive count when indexed in its operational angular direction.

3. The combination of claim 2 wherein the fuel dispensing means comprises a plurality of independently operable fuel dispensing apparatus, and wherein the counting system comprises connecting means for connecting the plurality of fuel dispensing apparatus in parallel to the second rotary counting device for indexing it in its operational angular direction in accordance with the amount of fuel dispensed by each of the fuel dispensing apparatus.

4. The combination of claim 1 wherein the second rotary counting device is said one counting device and the first rotary counting device is said other counting device and wherein both of the counting devices provide additive counts when indexed in their operative angular directions.

5. The combination of claim 4 wherein the fuel dispensing means comprises a plurality of independently operable fuel dispensing apparatus, wherein the counting system comprises a plurality of said second rotary counting devices for the plurality of fuel dispensing apparatus respectively adapted to be angularly indexed in operational angular directions thereof in accordance with the amount of fuel dispensed by the respective fuel dispensing apparatus, and wherein the inventory accounting means provides for selectively angularly resetting the second rotary counting devices in their operational angular directions to zero and for angularly indexing the first counting device in its operational angular direction in accordance with the complement of the count of the selected second counting device.

6. The combination of claim 1 wherein the counting devices have electromagnet means for independently angularly indexing the counter wheels thereof respectively; and wherein the inventory accounting means comprises an electrical pulse source, stepping switch means for sequentially connecting the pulse source to the electromagnet means of the single wheel counter of said one rotary counting device for angularly indexing the counter wheels thereof in stepwise fashion and for simultaneously energizing the electromagnet means of the corresponding single wheel counters of said other rotary counting device for angularly indexing the counter wheels thereof in stepwise fashion to transfer the complement of the count of said one rotary counting device to said other rotary counting device.

7. The combination of claim 6 wherein said one counting device comprises switching means for each counter wheel thereof and adapted for providing electrical outputs in accordance with the angular positions of the counter wheels respectively, and wherein said switching means are connected to index the stepping switch means to successively connect the pulse source to the single wheel counters of said one counting device.

8. A counting system with first and second rotary counting devices for storing first and second counts respectively and comprising first and second banks respectively of corresponding single wheel rotary counters of ascending order with counter wheels adapted to be individually angularly indexed in operational angular directions thereof and pulse actuated wheel operators for independently angularly indexing the counter wheels respectively in their operational angular directions in stepwise fashion; at least one of the rotary counting devices being resettable by angularly indexing the counter wheels thereof in stepwise fashion with their wheel operators and having switching means adapted for providing outputs in accordance with the angular position of the counter wheels respectively, and accounting means for combining the counts of the counting devices by transferring the count of said one rotary counting device to the other rotary counting device and comprising a pulse source, sequencing means operable for sequentially connecting the pulse source to the wheel operators of said one counting device and the corresponding wheel operators of the other counting device for indexing the wheels of said one counting device in sequence and simultaneously indexing the corresponding wheels respectively of the other counting device, the switching means of said one counting device being connected to timely operate the sequencing means to connect the pulse source to the operators of said one counting device in sequence for transferring the count of said one rotary counting device to the other rotary counting device.

9. The counting system of claim 8 wherein the sequencing means provides for connecting the pulse source to the operators of the single wheel rotary counters in descending sequence.

10. The counting system of claim 8 wherein the sequencing means is a stepping switch for sequentially connecting the pulse source to the operators of said one counting device.

11. The counting system of claim 8 wherein the wheel operators are electromagnetically actuated operators and wherein the pulse source is an electrical pulse source.

12. In combination with a fuel dispensing system having fuel storage means for receiving and storing fuel and fuel dispensing means for dispensing fuel from the fuel storage means, a counting system for accounting for the fuel remaining in the storage means comprising a first rotary counting device adapted to be angularly indexed in an operational angular direction thereof in accordance with the amount of fuel received by the storage means, a second rotary counting device connected to be angularly indexed in an operational angular direction thereof in accordance with the amount of fuel dispensed by the fuel dispensing means, at least one of said counting devices being resettable to zero by angularly indexing it in its operational angular direction, and inventory accounting means for angularly resetting said one counting device in its operational angular direction to zero and for angularly indexing the other counting device in its operational angular direction in accordance with the complement of the count of said one counting device and therefore in accordance with the resetting angular displacement of said one counting device, the first and second rotary counting devices comprising banks of corresponding single wheel rotary counters of ascending order with the counter wheels adapted to be individually angularly indexed in operational angular directions thereof and with lower order counter wheels connected to adjacent higher order counter wheels to generate a transfer thereto, the inventory accounting means providing for individually and sequentially indexing the counter wheels of said one counting device in the operational angular directions thereof and for simultaneously indexing the corresponding counter wheels respectively of said other counting device in the operational angular directions thereof in accordance with the complement of the count of the corresponding counter wheels of said one counting device, the single wheel counters having electromagnet means for independently angularly indexing the counter wheels thereof respectively, the inventory accounting means comprising an electrical pulse source, stepping switch means for sequentially connecting the pulse source to the electromagnet means of the single wheel counters of said one rotary counting device for angularly indexing the counter wheels thereof in stepwise fashion and for simultaneously energizing the electromagnet means of the corresponding single wheel counters of said other rotary counting device for angularly indexing the counter wheels thereof in stepwise fashion to transfer the complement of the count of said one rotary counting device to said other rotary counting device, the stepping switch means providing for successively connecting the pulse source to the electromagnet means of the single wheel counters of said one counting device in descending sequence, the counter wheels of said one counting device being adapted to count from 0 through 9, all but the lowest order counter wheel of said one counting device being initially reset by the pulse source to their 9 angular positions and the counter wheels of said other counting device being indexed a number of times equal the 9 complement of the count of the corresponding counter wheels of said one counting device, and the lowest order counter wheel of said one counting device being reset to its 0 angular position to generate transfers to the higher order counter wheels to reset them to 0 and the lowest order counter wheel of said other counting device being indexed a number of times equal to the 10 complement of the count of the lowest order counter wheel of said one counting device.

13. A counting system with first and second rotary counting devices for storing first and second counts respectively and comprising first and second banks respectively of corresponding single wheel rotary counters of ascending order with counter wheels adapted to be individually angularly indexed in operational angular directions thereof and pulse actuated wheel operators for independently angularly indexing the counter wheels respectively in their operational angular directions in stepwise fashion, at least one of the rotary counting devices being resettable by angularly indexing the counter wheels thereof in stepwise fashion with their wheel operators and having switching means adapted for providing outputs in accordance with the angular position of the counter wheels respectively, and accounting means for combining the counts of the counting devices comprising a pulse source, sequencing means operable for sequentially connecting the pulse source to the wheel operators of said one counting device and the corresponding wheel operators of the other counting device, the switching means of the one counting device being connected to timely operate the sequencing means to connect the pulse source to the operators of said one counting device in sequence, the sequencing means providing for connecting the pulse source to the operators of the single wheel rotary counters in descending sequence, the counter wheels of said one counting device being adapted to be angularly indexed to count from 0 through 9, and the sequencing means being operated by the switching means to provide for initially indexing all but the lowest order counter wheel of said one counting device to their 9 angular positions and for indexing the lowest order counter wheel of said one counting device to its 0 position.